US009350107B2

(12) United States Patent
Golob et al.

(10) Patent No.: US 9,350,107 B2
(45) Date of Patent: May 24, 2016

(54) CONTROL UNIT FOR A VEHICLE AND METHOD FOR PRODUCING A CONTROL UNIT FOR A VEHICLE

(75) Inventors: Andreas Golob, Neuhausen A.D.F. (DE); Uwe Kaechele, St. Johann-Wuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 13/883,694

(22) PCT Filed: Oct. 7, 2011

(86) PCT No.: PCT/EP2011/067562
§ 371 (c)(1),
(2), (4) Date: May 6, 2013

(87) PCT Pub. No.: WO2012/059297
PCT Pub. Date: May 10, 2012

(65) Prior Publication Data
US 2013/0225002 A1    Aug. 29, 2013

(30) Foreign Application Priority Data
Nov. 5, 2010 (DE) .......................... 10 2010 043 453

(51) Int. Cl.
*H01R 13/516* (2006.01)
*B60T 8/36* (2006.01)
*H01R 43/18* (2006.01)

(52) U.S. Cl.
CPC .............. *H01R 13/516* (2013.01); *B60T 8/368* (2013.01); *H01R 43/18* (2013.01); *Y10T 29/4921* (2015.01); *Y10T 29/49208* (2015.01)

(58) Field of Classification Search
CPC ....... B60T 8/368; H01R 13/516; H01R 43/18
See application file for complete search history.

(56) References Cited

U.S. PATENT DOCUMENTS 5,992,946 A    11/1999 Bayer et al.
6,059,381 A    5/2000 Bayer
(Continued)

FOREIGN PATENT DOCUMENTS

DE    19816766    7/1999
JP    2002508276    3/2002
(Continued)

OTHER PUBLICATIONS

International Search Report for Application No. PCT/EP2011/067562 dated Dec. 8, 2011 (English Translation and Original, 6 pages).

*Primary Examiner* — Briggitte R Hammond
(74) *Attorney, Agent, or Firm* — Michael Best & Frierich LLP

(57) ABSTRACT

The present invention relates to a control unit for a vehicle, in particular for an ABS device and/or an ESP device, comprising a housing part (2) which is produced from plastic and has an opening (21), and a motor contact (5) which produces an electrical contact between the control unit and a motor and which is arranged in the opening (21), wherein the motor contact (5) is a separate component and comprises at least one electric contact (6) and a base body (7) produced from plastic, wherein the motor contact (5) is arranged in the opening (21) in such a manner that the motor contact (5) partially protrudes from the housing part (2), and wherein the motor contact (5) is fastened to the housing part (2) by means of a connecting structure (8) between the base body (7) of the motor contact and the housing (2). Furthermore, the present invention relates to a method for producing a control unit for a vehicle, comprising the following steps: separately producing a housing part (2) and a motor contact (5), wherein the motor contact (5) has at least one electric contact (6) and a base body (7) produced from plastic, and fitting the motor contact (5) into an opening (21), which is formed in the housing part (2), in such a manner that a connecting structure between the base body (7) and the housing part (2) is produced, wherein the connecting structure is an ultrasound welding connection, an adhesive bonding connection and/or a latching connection.

13 Claims, 4 Drawing Sheets

(56) References Cited

U.S. PATENT DOCUMENTS

| | | |
|---|---|---|
| 6,241,489 B1 * | 6/2001 | Lewin et al. .................. 439/744 |
| 6,256,572 B1 * | 7/2001 | Rea ........................... 303/119.3 |
| 2003/0090147 A1 | 5/2003 | Risch et al. |
| 2005/0307914 | 9/2005 | Tupy |
| 2008/0174192 A1 | 7/2008 | Dinkel et al. |

FOREIGN PATENT DOCUMENTS

| | | |
|---|---|---|
| JP | 2005294481 | 10/2005 |
| WO | 94/27045 | 11/1994 |

* cited by examiner

CONTROL UNIT FOR A VEHICLE AND METHOD FOR PRODUCING A CONTROL UNIT FOR A VEHICLE

BACKGROUND OF THE INVENTION

The present invention relates to a control unit for a vehicle, in particular for an ABS device and/or ESP device, as well as to a method for producing a control unit.

Control units are known from the prior art in different embodiments and are used particularly in vehicles for controlling electronic auxiliary equipment, such as, for example, anti-lock braking systems (ABS) or electronic stability control programs (ESP). Because such control units are produced in large quantities, there are continually efforts to achieve improvements in the manufacturing process and assembly. In known control units, a component is, for example, a housing part in which a motor contact is arranged. The motor contact is thereby an integral constituent of the housing and for reasons of cost is inserted into the injection mold as an insert component during the injection molding process and is encapsulated with plastic. In so doing, a cost effective manufacturability can in fact be achieved; however, problems result during the transport of the intermediate component. This results from the fact that larger space requirements are necessary for the housing due to the integrated motor contact which protrudes from said housing. Because particularly an electrical contact additionally protrudes at the motor contact, the danger also constantly exists that damage may occur to the protruding electrical contact during handling and assembly of the intermediate component. For that reason, a number of precautionary measures must be taken in order to ensure a safe transport and safe assembly of said intermediate component. In addition, it is necessary for different vehicle manufacturers to provide different injection molds because the motor contacts are embodied differently in each case by the vehicle manufacturers. This then leads to a large number of variants, which in turn results in higher storage and assembly costs.

SUMMARY OF THE INVENTION

The control unit according to the invention for an electronic device in a vehicle has in contrast the advantage that the number of variants and therefore the manufacturing and storage costs can be significantly reduced. In addition, fewer problematic handling procedures result during assembly and a risk of damage to the control unit is further reduced. According to the invention, this is achieved by virtue of the fact that the control unit comprises a housing part, which is produced from plastic and has an opening, as well as a separate motor contact. The motor contact thereby produces an electrical contact between the control unit and an electrical motor, wherein said motor contact is arranged in the opening in the housing part. The separate motor contact comprises electric contacts and a base body produced from plastic. The motor contact is thereby arranged at least partially in the opening of the housing part and protrudes from said housing part. A connection between the motor contact and the housing part thus results between the base body produced from plastic and the housing part. A common housing part can therefore be used by all vehicle manufacturers, and only the motor contact is embodied specifically for each vehicle manufacturer. In addition, the protruding motor contact can be attached to the housing part just shortly prior to final assembly; and therefore there is no risk of damage to said motor contact protruding from the housing part during handling. In comparison to the insertion of a contact element into an injection mold, the production time can furthermore be significantly reduced on account of the housing part being separately produced according to the invention.

The connection between the housing part and the base body of the motor contact is preferably an ultrasound welding connection, an adhesive bonding connection and/or a latching connection. In this regard, the ultrasound welding connection is particularly preferred because a reliable and fluid-tight connection can thereby be produced between the motor contact and the housing part. If need be, the ultrasound welding connection can also be combined with a latching connection.

The opening in the housing part is designed in a particularly preferred manner as a through-hole. In so doing, a particularly compact assembly of the motor contact is facilitated.

The motor contact is furthermore preferably an elongated component comprising a first end region and a second end region, wherein a first electric contact is arranged at the first end region and a second electric contact at the second end region. A via through the housing part can therefore result by means of the motor contact. In a particularly preferred manner, the first electric contacts are flat contacts and the second electric contacts are pin-shaped contacts (pin contacts).

According to a further preferred embodiment of the invention, the base body of the motor contact comprises at least one outwardly protruding, annular collar, which has a first joining surface for the ultrasound welding connection or the adhesive bonding connection. In addition, a second joining surface is provided on the housing part, which forms a counter face to the first joining surface. The joining surfaces are preferably configured in the radial direction. It is furthermore preferable for reasons of simplification that an electrical contact plug be configured on the housing part.

In a preferential manner, the base body of the motor contact comprises guide surfaces in order to facilitate a guidance of the motor contact when being assembled in the opening. It is furthermore preferable for the opening to be configured on a collar protruding from a housing base. A simple and reliable connection is thereby possible between the motor contact and housing part.

The present invention further relates to a method for producing a control unit, in which a housing component is produced from plastic in a first step, preferably by means of injection molding, and a motor contact is produced from electric contacts and a plastic base body in a parallel step. The motor contact and the housing part are subsequently joined to one another, wherein the housing part is attached to the base body made of plastic. The connection between the base body and the housing part preferably results by means of ultrasonic welding, adhesive bonding and/or by means of a latching connection.

BRIEF DESCRIPTION OF THE DRAWINGS

A preferred exemplary embodiment of the invention is described below in detail with reference to the accompanying drawings. In the drawings.

DETAILED DESCRIPTION

While referring to FIGS. 1 to 5, a control unit 1 is described below in detail according to a preferred exemplary embodiment.

Figure 1:
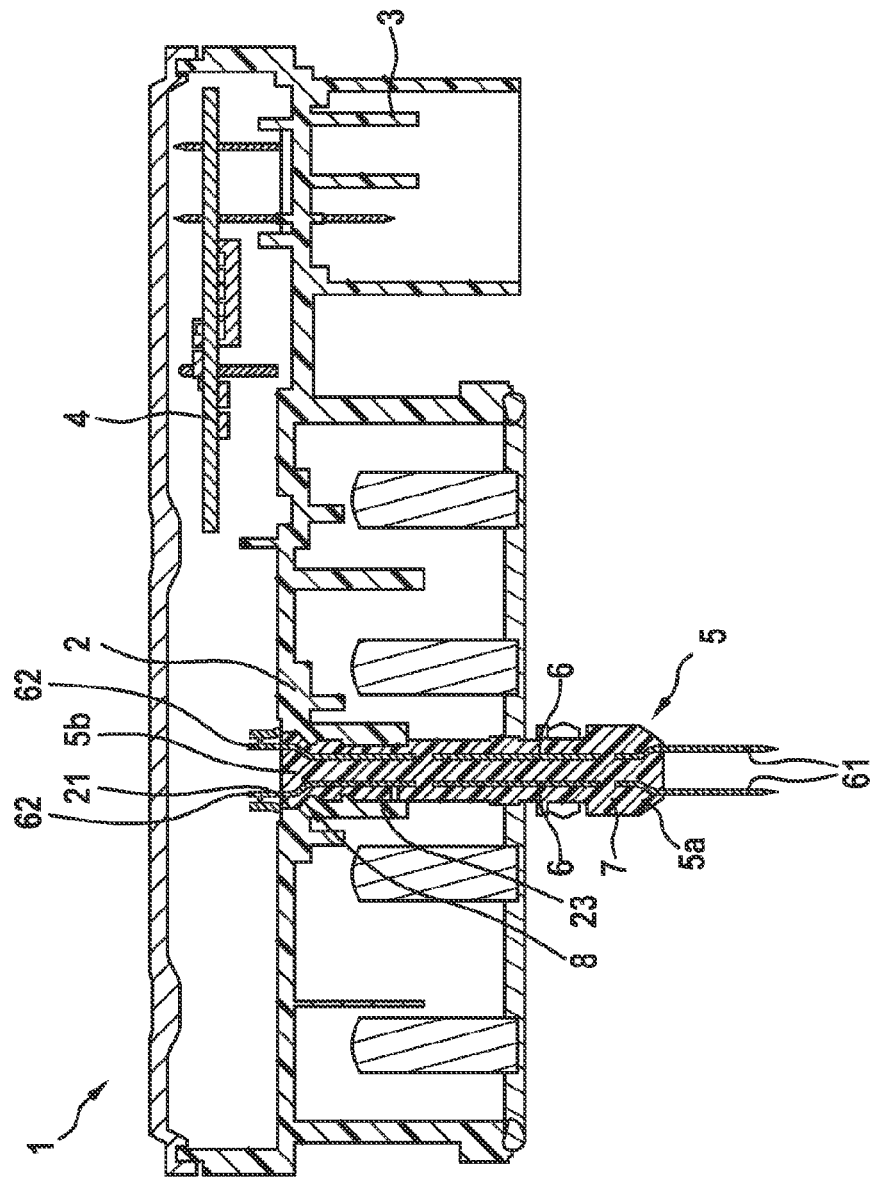
FIG. 1 shows a schematic sectional view of a control unit according to an exemplary embodiment of the invention.
Figure 2:
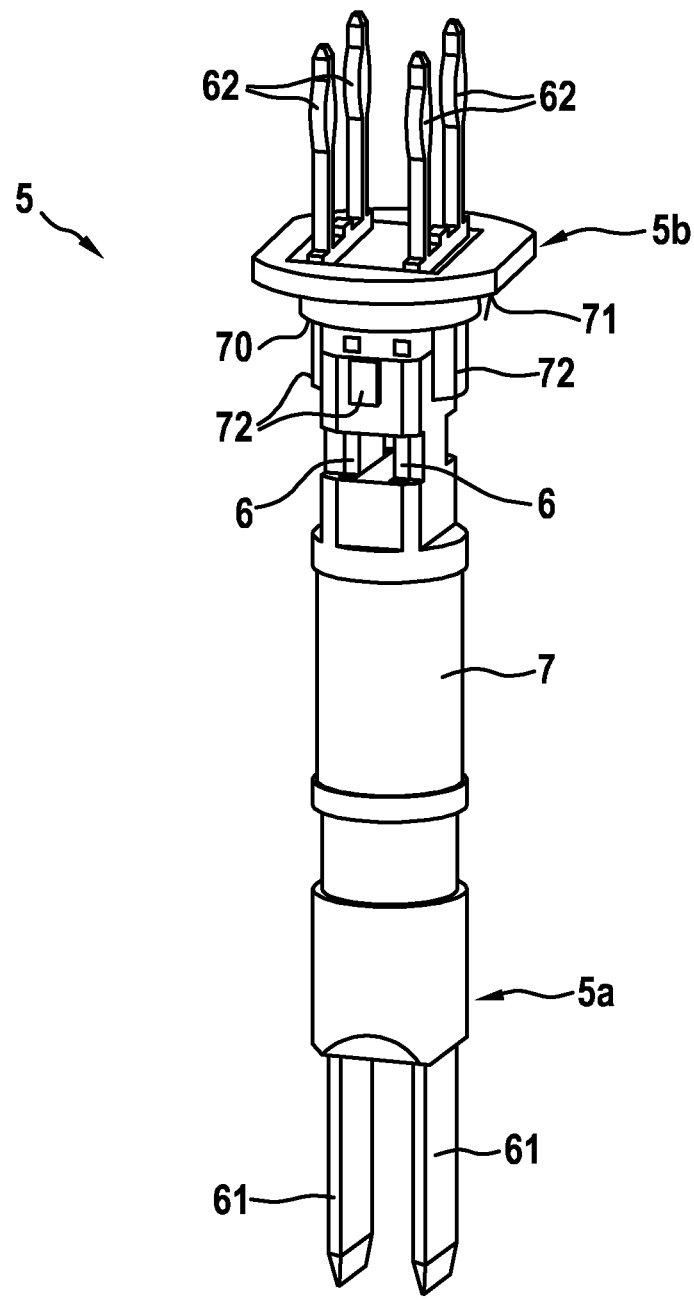
FIG. 2 shows a perspective view of a motor contact of the control unit.

As can be seen in FIG. 1, the control unit 1 comprises a housing part 2, which is produced from a plastic material by means of injection molding. A plug contact 3 is integrally formed on the housing part 2. Different electronic components (only indicated schematically) are arranged in the housing part 2. In addition, the control unit 1 comprises a motor contact 5, which is a separate component. The motor contact 5 is shown in detail in the FIGS. 2, 3 and 4.

The motor contact is a separate component and comprises electrical cable assemblies 6 and a base body 7 produced from plastic. In this exemplary embodiment, the motor contact 5 is an elongated component comprising a first end region 5a and a second end region 5b. Two first electric contacts 61 in the shape of flat contacts are provided at the first end region 5a. Four second electric contacts 62 in the shape of pin contacts are configured at the second end region 5b. As can be seen in FIG. 1, the motor contact 5 protrudes somewhat from the housing part 2. Said motor contact 5 is thereby attached to the housing part 2 by means of an ultrasound welding connection. In so doing, the ultrasound welding connection is provided between the base body 7 of the motor contact 5, which base body is produced from plastic, and the housing part 2, which is likewise produced from plastic. In this regard, the housing part 2 and the base body 7 are preferably produced from the same plastic material. The ultrasonic welding is in this case a very quick and simple procedure which produces a reliable and tight connection between the base body 7 and the housing part 2.

Figure 3:
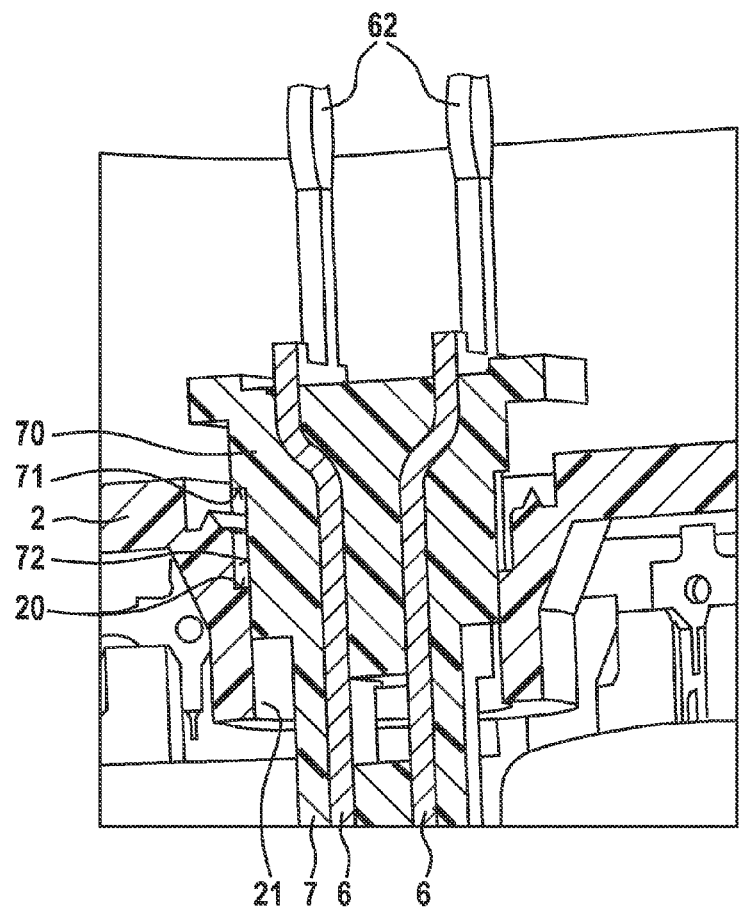
FIG. 3 shows an enlarged, partially cutaway, perspective view of the motor contact shortly prior to being assembled in a housing part.
Figure 4:
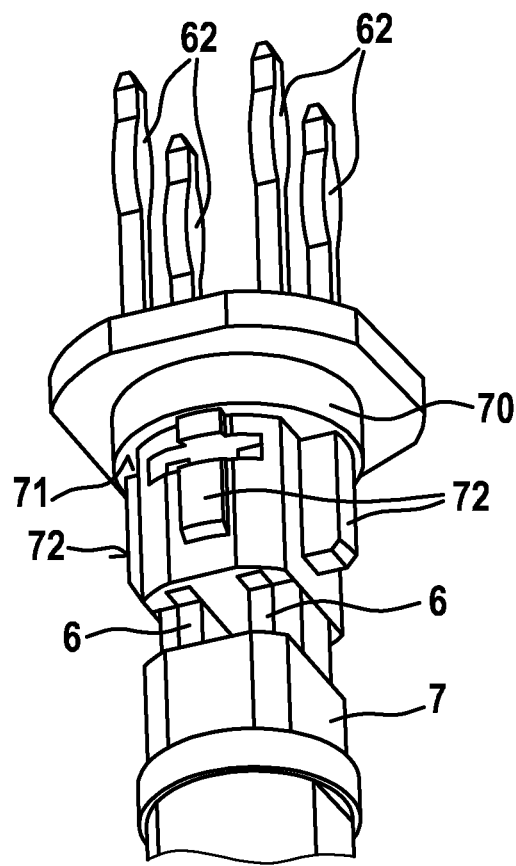
FIG. 4 shows a perspective partial view of the motor contact.
Figure 5:
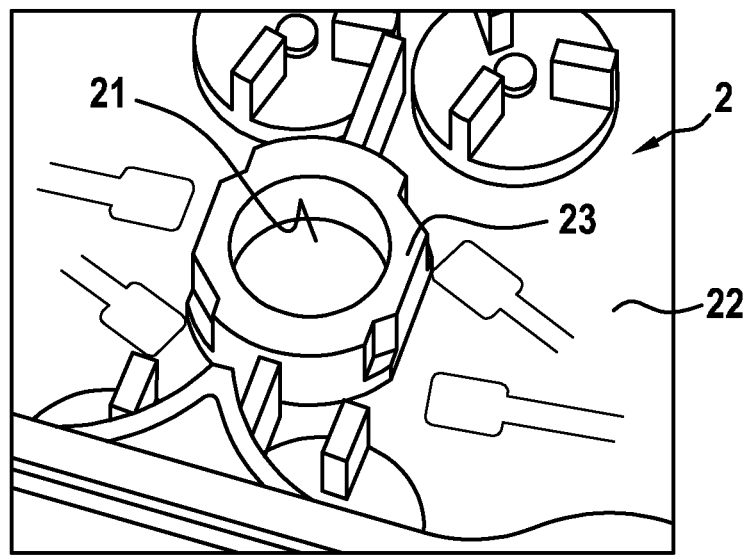
FIG. 5 shows a perspective partial view of the housing part.

As can be particularly seen in FIGS. 3 and 4, a collar 70 is formed on the base body 7 of the motor contact 5, said collar providing a first joining surface 71 for the ultrasound welding connection 8 at a side oriented towards the first end 5a. The second joining surface 20 opposite to the first joining surface 71 is provided on the housing part 2. A through-hole 21 is thereby provided on the housing part 2 for receiving the motor contact 5, wherein, as can be seen in FIG. 3, the through-hole 21 has a plurality of steplike regions, of which one of said regions forms the second joining surface 20. As can be further seen in FIG. 5, the housing part 2 comprises a housing base 22, whereat an annular collar 23 protrudes, said collar 23 enclosing the through-hole 21.

A total of four guide surfaces 72, which together with the through-hole 21 form a narrow clearance fit and take on the guidance of the motor contact 5 during assembly, are further provided on the base body 7 of the motor contact 5. In so doing, it can be ensured that said motor contact 5 is positioned correctly for assembly and especially for the ultrasonic welding procedure. According to the invention, the housing part 2 and said motor contact 5 can therefore in each case be cost effectively produced as separate components. As a result, it is particularly possible that the housing part 2 can, for example, be used for different control units of different vehicle manufacturers. An adaptation to the respective vehicle manufacturer or the respective vehicle then merely takes place via the individual motor contact 5, wherein particularly the arrangement of the electric contacts 6 can thereby be different. The motor contact 5 can also protrude in each case to different extents from the housing part 2.

An individual adaptation of the control unit 1 can thus take place via the motor contact 5. Aside from the increased variability, damage, particularly to the motor contact 5, can especially be prevented during the handling of the individual parts. Such damage occurs frequently in the prior art due to said motor contact 5 protruding beyond the housing part 2. The inventive configuration of the housing part 2 without an integrated motor contact 5 also leads to reduced storage space requirements. In addition, particularly the ultrasound welding connection 8 between the base body 7 and the housing part 2 forms a stable connection between the two components which at the same time is cost effective. It should thereby be noted that the connection between said motor contact 5 and said housing part 2 can also be provided as, e.g., an adhesive bonding connection or a latching connection. In the case of the latching connection, detent noses are, for example, provided on said motor contact 5, which engage behind the undercuts correspondingly formed in the housing part 2. Arbitrary combinations of the aforementioned types of connections are also possible.

The present invention is particularly used with control units for ABS and/or ESP applications.

What is claimed is:

1. A control unit for a vehicle, comprising:
   a housing part (2) which is produced from plastic and has an opening (21) and
   a motor contact (5) which produces an electrical contact between the control unit and a motor and which is arranged in the opening (21),
   wherein the motor contact (5) is a separate component and comprises at least one electric contact (6) and a base body (7) produced from plastic,
   wherein the motor contact (5) is arranged in the opening (21) in such a manner that said motor contact (5) partially protrudes from the housing part (2),
   wherein the motor contact (5) is fastened to the housing part (2) by a connecting structure (8) between the base body (7) of the motor contact and the housing (2), and
   wherein the base body (7) of the motor contact (5) has at least one outwardly protruding, annular collar (70), wherein the collar (70) has a first joining surface (71) for the connection (8) between the base body (7) and the housing part (2), and in that a second joining surface (20) for the connection (8) between the base body (7) and the housing part (2) is provided on said housing part (2).

2. The control unit according to claim 1, characterized in that the connecting structure (8) between the housing part (2) and the base body (7) of the motor contact (5) is at least one of an ultrasound welding connection, an adhesive bonding connection or a latching connection.

3. The control unit according to claim 1, characterized in that the opening (21) in the housing part (2) is a through-hole.

4. The control unit according to claim 1, characterized in that the motor contact (5) is an elongated component comprising a first end region (5a) and a second end region (5b), wherein a first electric contact element (61) is provided at the first end region (5a) and a second electric contact element (62) at the second end region (5b).

5. The control unit according to claim 4, characterized in that the first electric contact element (61) is a flat contact.

6. The control unit according to claim 1, characterized by guide surfaces (72) on the base body (7) of the motor contact, which guide the motor contact (5) when being fitted in the opening (21) in the housing part (2).

7. The control unit according to claim 1, characterized in that the opening (21) is arranged on a collar (23) protruding from a housing base (22).

8. The control unit according to claim 1, characterized in that an electrical plug contact (3) is also configured on the housing part (2).

9. A method for producing a control unit for a vehicle, comprising the steps:
- separately producing a housing part (2) as well as a motor contact (5), wherein the motor contact (5) has at least one electric contact (6) and a base body (7) produced from plastic and
- fitting the motor contact (5) into an opening (21) formed in the housing part (2) in such a manner that a connecting structure is produced between the base body (7) and the housing part (2), wherein the base body (7) of the motor contact (5) has at least one outwardly protruding, annular collar (70), wherein the collar (70) has a first joining surface (71) for a connection (8) between the base body (7) and the housing part (2), and in that a second joining surface (20) for the connection (8) between the base body (7) and the housing part (2) is provided on said housing part (2), and wherein the connecting structure is at least one of an ultrasound welding connection, an adhesive bonding connection or a latching connection.

10. The control unit according to claim 4, characterized in that the second electric contact element is a pin contact (62).

11. The control unit according to claim 10, characterized in that the first electric contact element (61) is a flat contact.

12. The control unit according to claim 1, wherein the connecting structure between the housing part and the base body of the motor contact is an ultrasound welding connection.

13. The method of claim 9, wherein the connecting structure is an ultrasound welding connection.

* * * * *